US011752631B2

(12) United States Patent
Panigrahi et al.

(10) Patent No.: US 11,752,631 B2
(45) Date of Patent: Sep. 12, 2023

(54) FLEET INSPECTION AND MAINTENANCE MOBILE ROBOT

(71) Applicant: Ford Global Technologies, LLC, Dearborn, MI (US)

(72) Inventors: Smruti Panigrahi, Farmington Hills, MI (US); Pavithra Madhavan, Windsor (CA); Justin Miller, Berkley, MI (US); Timothy Feldkamp, Ann Arbor, MI (US); Sanghyun Hong, Ann Arbor, MI (US); Kevin Hwang, Northville, MI (US); Kurt Lundeen, Wixom, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 17/171,066

(22) Filed: Feb. 9, 2021

(65) Prior Publication Data
US 2022/0250245 A1  Aug. 11, 2022

(51) Int. Cl.
*B25J 9/16* (2006.01)
*B25J 9/08* (2006.01)
(Continued)

(52) U.S. Cl.
CPC ............ *B25J 9/1679* (2013.01); *B25J 9/08* (2013.01); *B25J 9/1664* (2013.01); *B25J 9/1697* (2013.01);
(Continued)

(58) Field of Classification Search
CPC . B25J 9/1679; B25J 9/08; B25J 9/1664; B25J 9/1697; B25J 11/0085; B25J 13/006; B25J 13/088; B25J 5/007; B25J 11/00; B25J 18/06; B25J 9/06; B25J 11/85; B60S 5/04; G06Q 10/047; G06Q 10/20;
(Continued)

(56) References Cited

U.S. PATENT DOCUMENTS 9,305,407 B1  4/2016 Walton et al.
10,319,157 B2  6/2019 Minster et al.
(Continued)

OTHER PUBLICATIONS

Norton, P. (Jan. 9, 2020). 11 Winter Tips for Fleet Vehicle Maintenance Safety. C&P Fleet Services. Retrieved Nov. 1, 2022, from https://cpfleet.com/2020/01/09/11-winter-tips-for-fleet-vehicle-maintenance-safety/ (Year: 2020).*
(Continued)

*Primary Examiner* — Abby Y Lin
*Assistant Examiner* — Dylan Brandon Mooney
(74) *Attorney, Agent, or Firm* — Brandon Hicks; Eversheds Sutherland (US) LLP

(57) ABSTRACT

Systems and methods for fleet inspection and maintenance using a robot are provided. The robot may detect a maintenance issue of a vehicle of a fleet of vehicles via one or more sensors, generate a navigation route to a position proximal to the maintenance issue of the vehicle, traverse along the navigation route to the position, and execute a maintenance to rectify the maintenance issue of the vehicle. The robot may include a mobile base removably coupled to a modular platform for performing a maintenance task.

14 Claims, 4 Drawing Sheets

(51) Int. Cl.
 *B60S 5/04* (2006.01)
 *B25J 13/08* (2006.01)
 *B25J 11/00* (2006.01)
 *B25J 13/00* (2006.01)
(52) U.S. Cl.
 CPC ......... *B25J 11/0085* (2013.01); *B25J 13/006* (2013.01); *B25J 13/088* (2013.01); *B60S 5/04* (2013.01)
(58) Field of Classification Search
 CPC ........ G06Q 50/30; Y02T 10/70; G01M 17/00; G07C 5/00
 See application file for complete search history.

(56) References Cited

U.S. PATENT DOCUMENTS

| | | | | |
|---|---|---|---|---|
| 2008/0302200 | A1* | 12/2008 | Tobey | B25J 18/06 901/14 |
| 2010/0235037 | A1 | 9/2010 | Vian et al. | |
| 2015/0141756 | A1* | 5/2015 | Cheng | B25J 18/06 604/95.04 |
| 2016/0264262 | A1 | 9/2016 | Colin et al. | |
| 2017/0266806 | A1* | 9/2017 | Radin | B25J 9/126 |
| 2018/0215043 | A1* | 8/2018 | Michalakis | B60L 53/35 |
| 2019/0248007 | A1* | 8/2019 | Duffy | B25J 15/0066 |
| 2020/0223069 | A1* | 7/2020 | Tan | B25J 17/025 |
| 2020/0392793 | A1* | 12/2020 | Batarseh | E21B 43/26 |
| 2022/0084325 | A1* | 3/2022 | Crone | G06T 7/001 |

OTHER PUBLICATIONS

Norton, P. (2020). Fleet Service where and when you need it. Retrieved Nov. 1, 2022, from https://web.archive.org/web/20201031184810/https://cpfleet.com/fleet-services/ (Year: 2020).*

Priyan Gunatilake et al, "Image Understanding Algorithms for Remote Visual Inspection of Aircraft Surfaces", Dept. of Electrical and Computer Engineering, Robotics Institute, School of Computer Science, Carnegie Mellon University, Pittsburgh, PA, SPIE Digital Library, vol. 3029, Aug. 1999, 12 pages.

Omron, "Mobile robot fleet management: the 'air traffic controller' for your autonomous intelligent vehicles", OMRON Corporation, Aug. 19, 2019, 2 pages.

* cited by examiner

FLEET INSPECTION AND MAINTENANCE MOBILE ROBOT

BACKGROUND

A large number of commercial vehicles, such as vans, are used in fleets whose primary business is related to utilities, construction, or services, but not transportation. The drivers of these fleets are specialized technicians, driving being a secondary task. Yet the drivers may be required to perform vehicle maintenance related tasks, such as visual inspection for damages. Moreover, fleet operators must handle regular maintenance, such as oil change, tire pressure, or car wash, for all the vehicles they own. With the rise of electric vehicles (EVs), charging the vehicles would be an added task. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
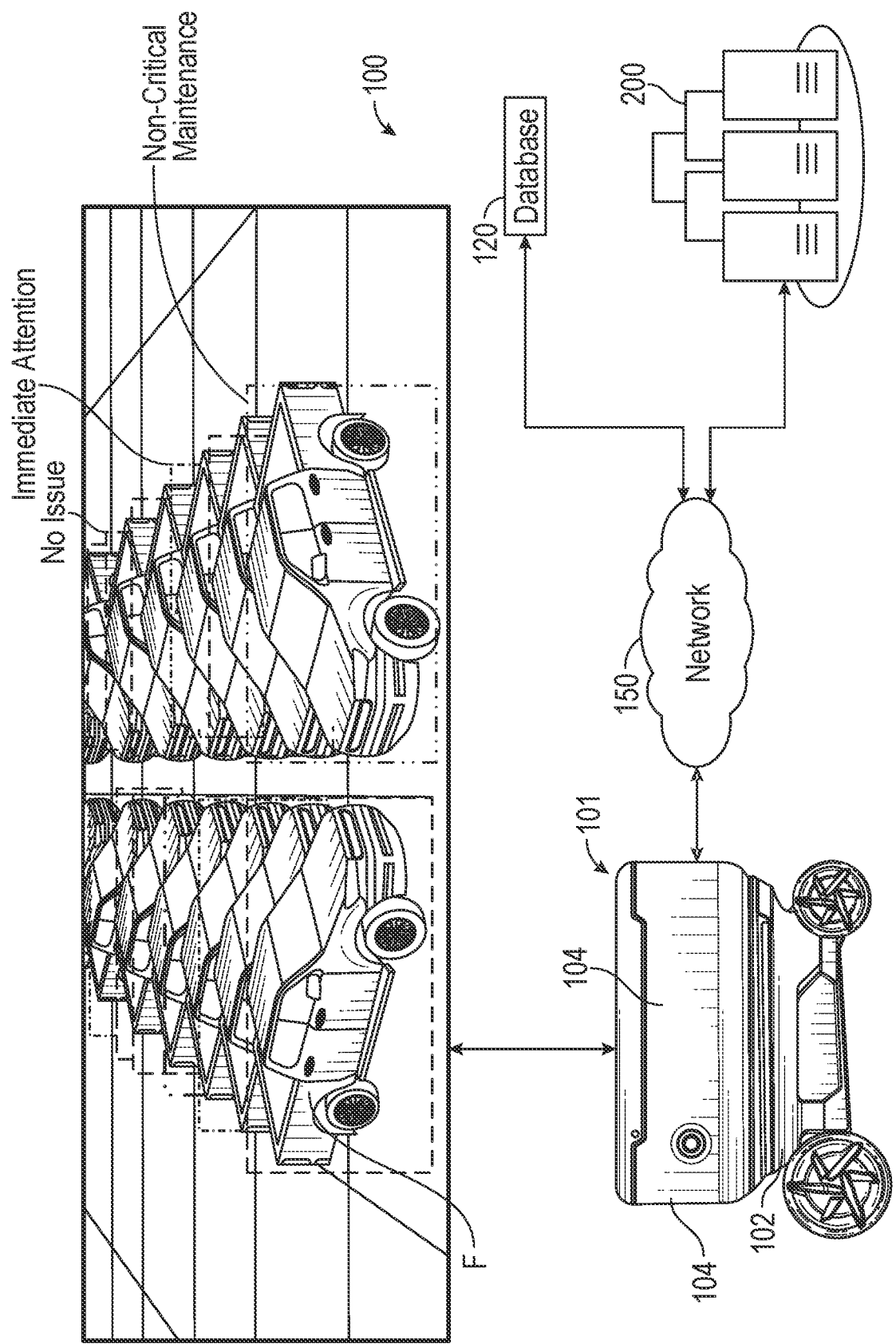
FIG. 1 illustrates a system for fleet inspection and maintenance using a robot in accordance with the principles of the present disclosure.

Disclosed are systems and methods of using one or more robots to automate inspection and maintenance for commercial fleet vehicles. The robots may be deployed while the vehicles are left in a parking lot overnight, thereby turning the downtime into a maintenance period, such that vehicles are checked, repaired if necessary, and ready to go the moment the driver arrives in the morning. A database may store data about the entire fleet, tracking any maintenance needs and may communicate this with the robot. The robot may move around the parked fleet, performing visual inspection for damages and/or performing maintenance as required.

The robot may be capable of autonomous navigation in a parking lot and around parked vehicles. Such a robot may be equipped with a sensor suite which may include cameras, LIDAR systems, ultrasonic sensors, and the like. With the help of these sensors, the robot is able to localize itself within the parking lot, avoid obstacles, identify vehicles, etc. The map of the parking lot may either be created on the fly, e.g., using Simultaneous Localization and Mapping (SLAM), for each operation or it may be a static map created by manually driving the robot as a part of fleet setup.

The robot also may be equipped with actuators such as motors and computers. For example, the computer may be responsible for processing sensor data and applying perception algorithms which may include neural network-based object detection, segmentation, etc. The computer also may be responsible for planning a safe navigable path for the robot, computing real-time goals, and controlling actions for the actuators. The robot also may have the ability to reconfigure/adapt to different tasks on its task list and/or charge itself. In order to reconfigure, the robot will be able to precisely position itself relative to the new platform.

To inspect the vehicle for damages, a robot may employ multiple methods. For example, the robot may use a camera-based method where a perception algorithm is trained to detect and annotate damages such as scratches, dirty car, flat tires, dents, windshield damage, etc. Additionally or alternatively, the robot may use a 3D LIDAR scanning device to scan the vehicle and form a 3D model. This model may be compared to previous 3D models of the vehicle state such that new dents and deformations be easily be identified. An optimal solution would be a combination of the two.

The robot may be capable of performing various maintenance tasks on the vehicle. These different tasks may be performed by interchangeable platforms that may be attached to a base of the robot. For example, to automatically adjust tire pressure of a vehicle, the robot may position itself in front of the tire, locate the valve cap and remove it, and fix an inflator to the valve. The robot may have sensors in the rear to locate the tire and the valve, and a snake robot type end effector to reach the valve. Moreover, the snake robot arm may be attached to a drill with a socket wrench head, which may unscrew the cap valve and the electronic inflator.

Another maintenance task the robot may perform is charging an electric vehicle (EV) battery. For example, a platform on the robot may have a chargeable battery and a snake type robot arm equipped with sensors for positioning. This platform may slide over the base of the robot which may carry it to and position it in front of the charging port of the EV. The snake robot arm may then be manipulated to connect the EV to the battery on the platform. Other tasks for which platforms could be provided on the robot may include, e.g., car-wash, oil change, de-icing, dent removal, changing tire-wheel assembly, etc.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, exemplary system 100 for fleet inspection and maintenance is provided. As shown in FIG. 1, system 100 includes modular robot 101 configured to inspect and execute maintenance procedures on one or more vehicles of vehicle fleet F, and database 120, e.g., a cloud database, all communicatively coupled to fleet maintenance operation platform 200 via, e.g., network 150. Fleet F may include one or more vehicles, e.g., commercial vans, that are parked in a defined space such as a parking lot. Accordingly, modular robot 101 may perform inspection and maintenance of the vehicles of fleet F when the vehicles are not in use, e.g., parked overnight. Database 120 may maintain data of entry/exit of the vehicles of fleet F, and may track the maintenance needs/status of the vehicles of fleet F. Robot 101 and/or the fleet operator may communicate with database 120 as necessary. Database 120 and/or fleet maintenance operation platform 200 may be located on one or more servers, and/or may be integrated with robot 101.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, vehicle-to-infrastructure (V2I), and/or a vehicle-to-everything (V2X) communication.

As shown in FIG. 1, robot 101 may include mobile base 102 which may be removably coupled to modular platform 104, as well as a sensor suite, communication system, actuators (e.g., motors), and a computer having one or more processors for processing sensor data and applying perception algorithms which may include neural network-based object detection, segmentation etc. The computer also may plan a safe navigable path for the robot, compute real-time goals, and control actions for the actuators. Alternatively, mobile base 102 and platform 104 may be a single component. As shown in FIG. 1, mobile base 102 may include a plurality of wheels which may be individually actuated to provide robot 101 mobility.

Figure 2:
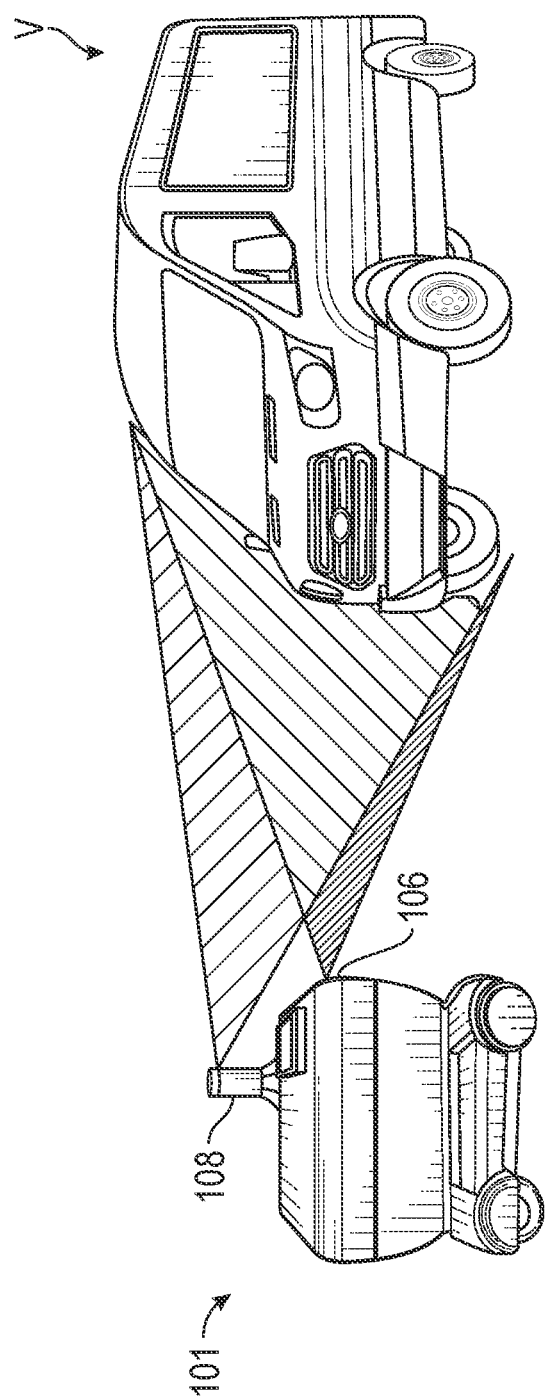
FIG. 2 illustrates an exemplary robot and a fleet vehicle in accordance with the principles of the present disclosure.

The sensor suite of robot 101 may include cameras, LIDAR scanning devices, and/or ultrasonic sensors, which may be used to localize robot 101 within the parking lot, avoid obstacles, and identify vehicles of fleet F. For example, as shown in FIG. 2, robot 101 may use camera 106 and/or LIDAR scanning device 108 to identify vehicle V of fleet F, as well as to capture data indicative of maintenance issues such as under inflated tires, flat tires, scratches, dents, windshield damage, dirt, etc. Accordingly, the computer of robot 101 may implement perception algorithms to identify the maintenance issues based on the data captures by camera 106 and/or LIDAR scanning device 108. As will be understood by a person having ordinary skill in the art, camera 106 and/or LIDAR scanning device 108, as well as the computer, may be disposed on either base 102 or platform 104, or both.

Moreover, modular platform 104 may be configured to perform one or more maintenance procedures, as described in further detail below. Accordingly, when a maintenance issue is identified by the computer of robot 101 based on the captured data, the computer may determine whether the current modular platform 104 coupled to base 102 is capable of performing the maintenance procedure, or if robot 101 needs to be reconfigured, e.g., swap out modular platform 104 with another modular platform capable of performing the maintenance procedure. Accordingly, the computer may search database 120 to determine whether the necessary platform is available, including the location of such a platform. Mobile base 102 may direct robot 101 to the new platform such that reconfiguration may be completed, and then mobile base 102 may direct robot 101 with the new platform back to vehicle V. Alternatively, the computer may determine that a human, e.g., the fleet manager, is required to perform the maintenance required to rectify the maintenance issue. The computer may then update database 120 accordingly. In addition, mobile base 102 may direct robot 101 to a charging station to charge itself if the computer determines that the battery level of robot 101 is low.

A map of the parking lot and fleet F may either be created on the fly (e.g., SLAM) for each operation or it may be a static map created by manually driving robot 101 as a part of fleet setup. The vehicles of fleet F may be allocated to unique positions on the map, such that each vehicle and their maintenance status may be identified by its respective location on the map. For example, as shown in FIG. 1, each vehicle of fleet F may be identified, e.g., as having no issues, needing non-critical maintenance, or requiring critical, immediate attention, and such identifying information may be stored in database 120. Accordingly, robot 101 may be capable of autonomous navigation to move around fleet F and perform visual inspection for damages and perform maintenance as required.

Figure 3:
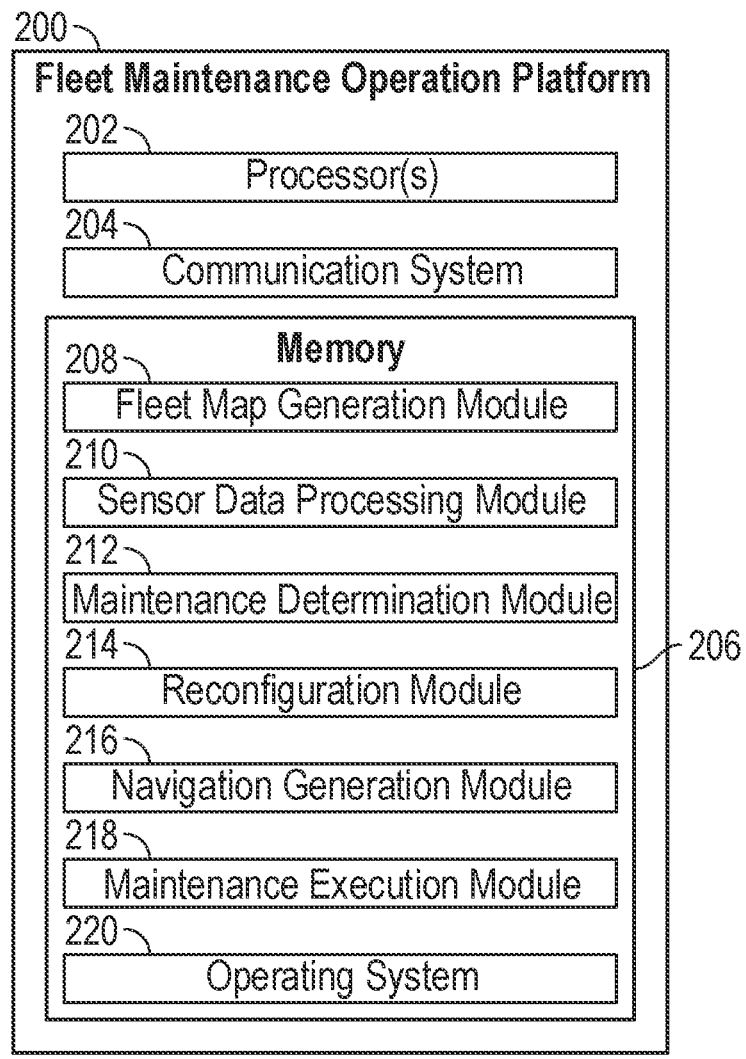
FIG. 3 shows some example components that may be included in a fleet maintenance operation platform in accordance with the principles of the present disclosure.

Referring now to FIG. 3, components that may be included in fleet maintenance operation platform 200 are described in further detail. Fleet maintenance operation platform 200 may include one or more processors 202, communication system 204, and memory 206. Communication system 204 may include a wireless transceiver that allows energy efficient operation platform 200 to communicate with robot 101 and database 120. The wireless transceiver may use any of various communication formats, such as, for example, an Internet communications format, or a cellular communications format.

Memory 206, which is one example of a non-transitory computer-readable medium, may be used to store operating system (OS) 220, fleet map generation module 208, sensor data processing module 210, maintenance determination module 212, reconfiguration module 214, navigation generation module 216, and maintenance execution module 218. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Fleet map generation module 208 may be executed by processor 202 for generating a map of the parking lot and fleet F, e.g., on the fly using SLAM, or generating a static map via manually driving of robot 101 around fleet F. Sensor data processing module 210 may be executed by processor 202 for receiving and processing data received from the sensor suite of robot 101, e.g., camera 106 and/or LIDAR scanning device 108. In addition, sensor data processing module 210 may receive data indicative of tire pressure, oil level, battery level of an EV, etc. from one or more sensors of the sensor suite of robot 101 during routine inspection, as described in further detail below.

Maintenance determination module 212 may be executed by processor 202 for identifying one or more maintenance issues based on the data received from sensor data processing module 210. For example, maintenance determination module 212 may identify scratches, dirt, ice, flat tires, dents, windshield damage, etc. based on the data. Moreover, during inspection of the vehicles of fleet F, maintenance determination module 212 may determine that a vehicle needs an oil change, a tire replacement, additional air in a tire, a re-charge, etc. based on data received from sensor data processing module 210 during routine inspection.

Reconfiguration module 214 may be executed by processor 202 for determining whether the current platform coupled to mobile base 102 is capable of performing the requisite maintenance, identifying a suitable platform within database 120 if the current platform is not capable, causing mobile base 102 to decouple from the current platform, and causing mobile base 102 to couple to the suitable platform. Navigation generation module 216 may be executed by processor 202 for generating a navigation route to a position relative to the vehicle such that the maintenance procedure may be executed, and causing mobile base 102 to direct robot 101 to the position. Maintenance execution module 218 may be executed by processor 202 for causing robot 101 to perform the requisite maintenance procedure. For example, maintenance execution module 218 may cause robot 101 to inflate a tire, change a tire, wash the vehicle, remove a dent from the vehicle, de-ice the vehicle, charge the EV, change the oil of the vehicle, etc.

Figure 4:
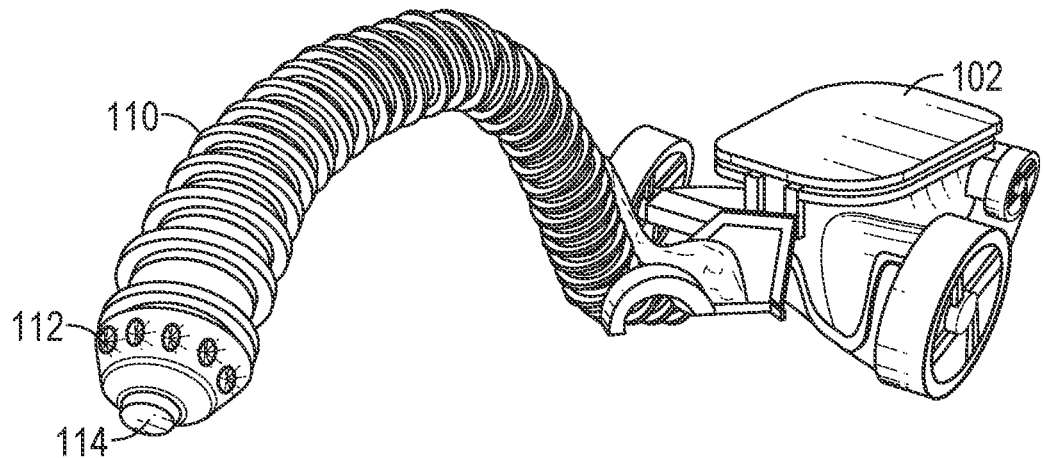
FIG. 4 illustrates an embodiment of the robot of FIG. 1 with a snake arm in accordance with the principles of the present disclosure.

As shown in FIG. 4, robot 101 may include snake arm 110 extending therefrom, which may be actuated to be positioned along the vehicle to receive inspection and/or maintenance. As shown in FIG. 4, snake arm 110 may include a plurality of sensors 112 for facilitating positioning of snake arm 110, and port 114. Depending on the maintenance required, port 114 may configured to perform the requisite maintenance. For example, if the maintenance issue is a tire that needs more air, sensors 112 may guide port 114 of snake arm 110 toward the valve of the tire of the vehicle, such that port 114 may be coupled to the valve. Port 114 may include, e.g., a drill with a socket wrench head for removing the valve cap of the valve, and may inflate the tire with air from an air source coupled to robot 101. Port 114 may then re-couple the valve cap to the valve when the tire has been inflated. Accordingly, one of the sensors of sensors 112 may include a pressure gauge to measure the pressure within the tire. Alternatively, if the maintenance issue is a dirty car, port 114 may be configured to dispense cleaning fluid to wash the vehicle. If the maintenance issue is a dent in the vehicle, port 114 may be configured to be coupled to the dent, and apply pressure to remove the dent. If the maintenance issue is a low EV battery level, port 114 may be coupled to the charging port of the EV, and transmit energy to the EV.

Figure 5:
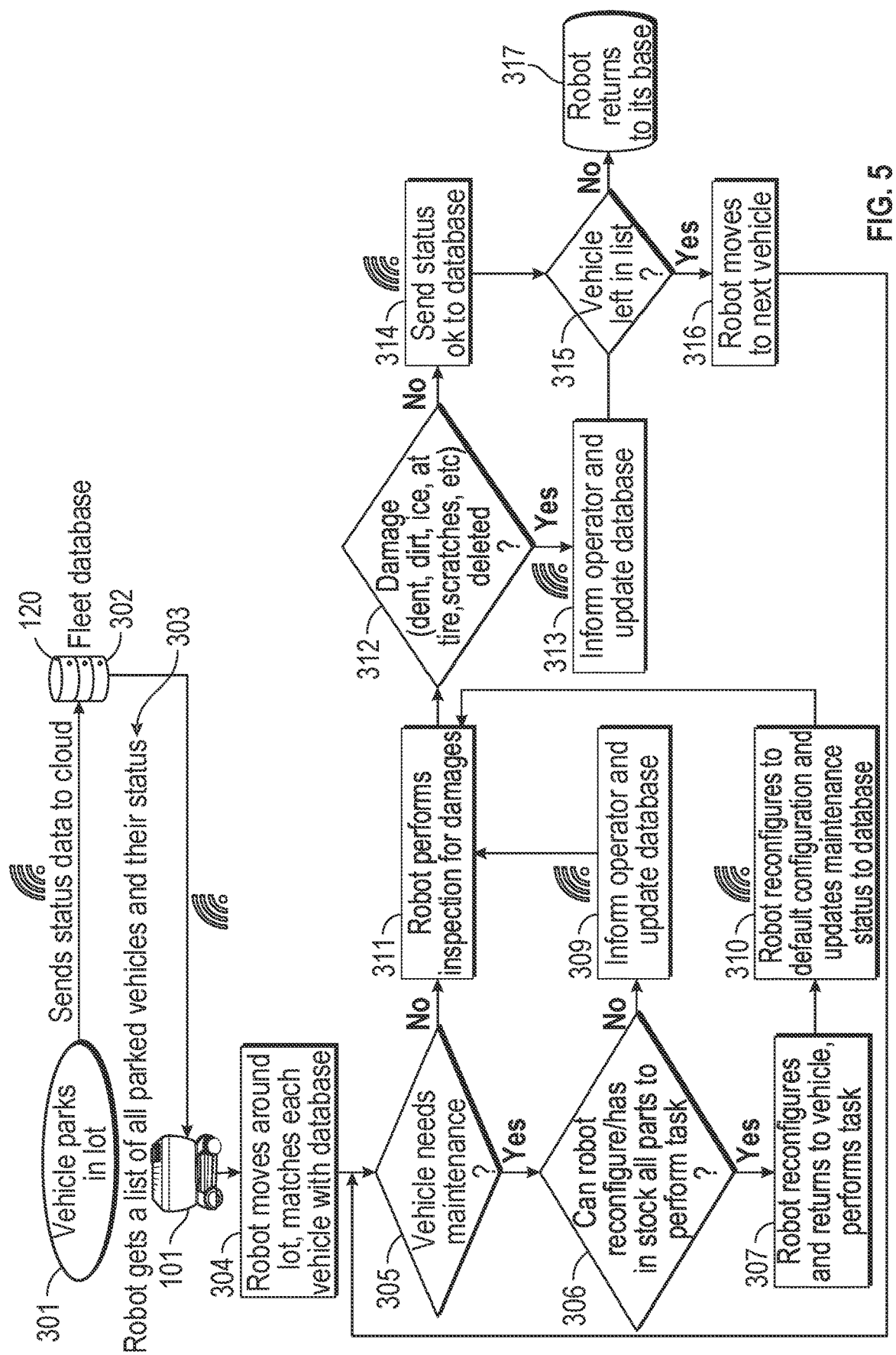
FIG. 5 is a flow chart illustrating exemplary steps of a method for fleet inspection and maintenance using a robot in accordance with the principles of the present disclosure.

Referring now to FIG. 5, a flow chart illustrating exemplary steps of a method for fleet inspection and maintenance using robot 101 is provided. At step 301, the vehicles of fleet F may be parked in the parking lot to be inspected and receive maintenance if necessary, e.g., overnight. At step 302, database 120 receives data regarding the vehicles of fleet F, e.g., status of the vehicles. For example, each vehicle of fleet F may be identified, e.g., as having no issues, needing non-critical maintenance, or requiring critical, immediate attention, and such identifying information may be stored in database 120. At step 303, robot 101 may receive the vehicle information from database 302 for each vehicle in fleet F. At step 304, robot 101 may autonomously navigate around the parking lot, to identify the vehicles and match them with the vehicle information received from database 302. Each vehicle may be parked in the same spot within the parking lot for easy identification, or alternatively, robot 101 may implement a tagging mechanism to easily identify the vehicles without needing to go close to them.

At step 305, robot 101 may inspect a vehicle, e.g., via the sensor suite onboard robot 101, and determine whether the vehicle requires maintenance, e.g., tire inflation, tire change, oil change, battery charge, etc. For example, to inspect the vehicle for damages, robot 101 may use a camera-based method where a perception algorithm is trained to detect and annotate damages such as scratches, dirty car, flat tires, dents, windshield damage, etc. Additionally or alternatively, robot 101 may use a 3D LIDAR scanning device to scan the vehicle and form a 3D model. This model may be compared to the 3D model of the prior vehicle state such that new dents and deformations may easily be identified. An optimal solution would be a combination of the two. If robot 101 determines that the vehicle needs maintenance, at step 306, robot 101 determines whether it is currently able to perform the maintenance, e.g., whether the current platform coupled to base 102 is suitable for performing the maintenance procedure, or may be reconfigured to perform the maintenance procedure, e.g., swap the current platform with a different suitable platform. If robot 101 determines that the vehicle does not need maintenance, robot 101 may proceed to step 311.

If robot 101 is capable of performing the maintenance procedure or being reconfigured to perform the maintenance procedure, at step 307, robot 101 may perform the maintenance procedure, or be reconfigured and return to the vehicle to perform the maintenance procedure. If robot 101 is not capable of performing the maintenance procedure or being reconfigured to perform the maintenance procedure, at step 309, robot 101 may inform the fleet operator and updated database 120 and proceed to step 311. After robot 101 performs the maintenance procedure at step 307, at step 310, robot 311 may reconfigure to its default configuration, and may update database 120 with the maintenance status of the vehicle, and proceed to step 311.

At step 311, robot 101 may perform a visual inspection of the vehicle, e.g., via cameras 106 and/or LIDAR scanning device 108. At step 312, robot 101 determines whether any damages, e.g., dent, dirt, ice, flat tire, scratches, etc., are present on the vehicle. If robot 101 determines that the vehicle has one or more damages, at step 313, robot 101 may inform the fleet operator and updated database 120, and proceed to step 315. If robot 101 determines that the vehicle does not have any damages, at step 314, robot 101 may transmit an OK status update to database 120 for the vehicle, and proceed to step 315.

Once inspection and maintenance of the vehicle is complete, at step 315, robot 101 may determine whether there is another vehicle in fleet F that needs to be inspected and/or receive maintenance, e.g., based on the data received from database 120 at step 303. If robot 101 determines there is another vehicle that needs to inspected and/or receive maintenance, at step 316, robot 101 is directed to the next vehicle and returns to step 305 described above. If robot 101 determines there are no additional vehicles that needs to inspected and/or receive maintenance, at step 317, robot 101 may return to its base, e.g., to be recharged. Alternatively, to improve efficiency, robot 101 may perform all the tasks that can be done with the current robot configuration on all vehicles needing it before reconfiguring, e.g., instead of reconfiguring per vehicle as described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A robot for fleet inspection and maintenance, the robot comprising:
    a mobile base configured to be removably coupled to a modular platform;
    one or more sensors configured to detect a maintenance issue of a vehicle of a fleet of vehicles;
    a snake arm coupled to the modular platform, the snake arm comprising a port disposed on a distal end of the snake arm and a plurality of positioning sensors configured to facilitate positioning of the snake arm and the port, wherein the plurality of positioning sensors are disposed in a ring around the port;
    a memory that stores computer-executable instructions; and
    a processor configured to access the memory and execute the computer-executable instructions to:
        generate a map of the area housing the fleet using simultaneous localization and mapping;
        allocate a location on the map to the vehicle of the fleet of vehicles, wherein a maintenance status of the vehicle is identified by the vehicle's location on the map;
        generate a navigation route to a position proximal to the maintenance issue of the vehicle;
        cause the mobile base to traverse the navigation route to the position; and
        execute a maintenance to rectify the maintenance issue of the vehicle,
    wherein the plurality of positioning sensors are disposed on a slanted surface of the distal end, and wherein the plurality of positioning sensors face a direction parallel to a normal direction of the slanted surface so that the plurality of positioning sensors face at least partially radially outward from the port.

2. The robot of claim 1, wherein the modular platform is interchangeable.

3. The robot of claim 2, wherein the processor is further configured to determine whether a different interchangeable platform is required to execute the maintenance to rectify the maintenance issue of the vehicle.

4. The robot of claim 3, wherein the processor is further configured to cause the mobile base to decouple from the modular platform, and to couple to the different interchangeable platform.

5. The robot of claim 1, wherein the one or more sensors comprise a camera.

6. The robot of claim 1, wherein the one or more sensors comprise a LIDAR scanning device.

7. The robot of claim 1, wherein the snake arm is configured to extend from the robot to the maintenance issue.

8. The robot of claim 7, wherein the maintenance issue comprises a low air-pressure of a tire, and wherein the maintenance comprises:
    identifying a valve of the tire via the one or more sensors;
    extending the snake arm to the valve;
    coupling the snake arm to the valve; and
    inflating the tire of the vehicle.

9. The robot of claim 7, wherein the maintenance issue comprises a low battery, and wherein the maintenance comprises:
    identifying a charging port of the vehicle via the one or more sensors;
    extending the snake arm to the charging port;
    coupling the snake arm to the charging port; and
    charging the vehicle.

10. The robot of claim 1, wherein the maintenance issue comprises a dirty vehicle, and wherein the maintenance comprises washing the vehicle.

11. The robot of claim 1, wherein the maintenance issue comprises a dent in the vehicle, and wherein the maintenance comprises removing the dent.

12. The robot of claim 1, wherein the maintenance issue comprises a tire in need of a tire change, and wherein the maintenance comprises removing the tire from the vehicle and replacing the tire with another tire.

13. The robot of claim 1, wherein the maintenance issue comprises an icy vehicle, and wherein the maintenance comprises de-icing the vehicle.

14. The robot of claim 1, wherein the maintenance issue comprises an oil change, and wherein the maintenance comprises changing the oil of the vehicle.

* * * * *